(12) United States Patent
Porsch

(10) Patent No.: US 10,296,797 B2
(45) Date of Patent: May 21, 2019

(54) IDENTIFICATION OF SEAT OCCUPANCY BY MEANS OF A CAMERA

(71) Applicant: SIEMENS MOBILITY GMBH, Munich (DE)

(72) Inventor: Roland Porsch, Speichersdorf (DE)

(73) Assignee: Siemens Mobility GmbH, Munich (DE)

( * ) Notice: Subject to any disclaimer, the term of this patent is extended or adjusted under 35 U.S.C. 154(b) by 156 days.

(21) Appl. No.: 15/301,990

(22) PCT Filed: Apr. 10, 2015

(86) PCT No.: PCT/EP2015/057822
§ 371 (c)(1),
(2) Date: Oct. 5, 2016

(87) PCT Pub. No.: WO2015/155328
PCT Pub. Date: Oct. 15, 2015

(65) Prior Publication Data
US 2017/0116489 A1 Apr. 27, 2017

(30) Foreign Application Priority Data

Apr. 11, 2014 (DE) .................. 10 2014 207 009

(51) Int. Cl.
*G06K 19/06* (2006.01)
*G06K 9/00* (2006.01)
(Continued)

(52) U.S. Cl.
CPC ......... *G06K 9/00838* (2013.01); *B60N 2/002* (2013.01); *B60R 21/01538* (2014.10);
(Continued)

(58) Field of Classification Search
CPC ........ B60R 21/01538; B60R 21/01552; B60R 2021/0048; B60R 2021/01315; B60R 2011/0017; G06K 9/00362; G06K 9/00369
See application file for complete search history.

(56) References Cited

U.S. PATENT DOCUMENTS

2012/0041648 A1* 2/2012 Yamaguchi ............ B60N 2/002
701/49
2012/0296567 A1* 11/2012 Breed ..................... G01C 21/26
701/468
(Continued)

FOREIGN PATENT DOCUMENTS

DE 102004020255 A1 9/2005
FR 2877279 A1 5/2006
(Continued)

OTHER PUBLICATIONS

Makrushin, A., et al., "The feasibility test of state-of-the-art face detection algorithms for vehicle occupant detection", Proc. SPIE 7532, Image Processing: Algorithms and Systems VIII, Feb. 8, 2010.
(Continued)

*Primary Examiner* — Obafemi O Sosanya
(74) *Attorney, Agent, or Firm* — Laurence Greenberg; Werner Stemer; Ralph Locher

(57) ABSTRACT

A method and an apparatus for identifying occupancy of a seat use a camera. In order to achieve permanently reliable identification of the occupancy of a seat, the camera is oriented such that it captures at least one area of interest of the seat. An evaluation apparatus is used to identify the area of interest in a picture taken by the camera and to store a position for the area of interest. The evaluation apparatus selects the area of interest in pictures subsequently taken by the camera at the stored position and compares the area of (Continued)

interest with at least one stored picture sample. A result of this comparison is taken as a basis for identifying the seat as being occupied. In addition, an apparatus having a camera and an evaluation apparatus is described for performing the method.

13 Claims, 6 Drawing Sheets

(51) Int. Cl.
*B60N 2/00* (2006.01)
*B60R 21/015* (2006.01)
*G06K 9/62* (2006.01)
*H04N 5/33* (2006.01)

(52) U.S. Cl.
CPC ....... *G06K 9/00221* (2013.01); *G06K 9/6202* (2013.01); *G06K 19/06028* (2013.01); *G06K 19/06037* (2013.01); *H04N 5/33* (2013.01)

(56) References Cited

U.S. PATENT DOCUMENTS

| | | |
|---|---|---|
| 2014/0032098 A1 | 1/2014 | Anderson |
| 2014/0097957 A1 | 4/2014 | Breed et al. |
| 2014/0098232 A1* | 4/2014 | Koike ................ G06K 9/00369 |
| | | 348/148 |
| 2014/0294198 A1* | 10/2014 | Hall ......................... H04R 3/02 |
| | | 381/93 |

FOREIGN PATENT DOCUMENTS

| | | |
|---|---|---|
| JP | 2005049220 A | 2/2005 |
| RU | 58087 U1 | 11/2006 |

OTHER PUBLICATIONS

Hajati, F., et al., "Face Localization using an Effective Co-Evolutionary Genetic Algorithm", Digital Image Computing: Techniques and Applications (DICTA), 2010, pp. 522-527.

* cited by examiner

IDENTIFICATION OF SEAT OCCUPANCY BY MEANS OF A CAMERA

BACKGROUND OF THE INVENTION

Field of the Invention

The invention relates to a method for identifying seat occupancy by means of a camera and an apparatus for carrying out this method comprising a camera.

In particular in the field of passenger transportation, there is interest in identifying seat occupancy. In the automobile industry, for this purpose, sensors are usually installed in the seats which identify the seats as occupied when they are loaded. Due to the mechanical loading, the lifetime of the sensor technology used therefor is limited to approximately 50,000 loading situations. This lifetime can be sufficient for individual transport. It is not sufficient for public passenger transportation and in particular for rail transport. With an assumed seat lifetime of ten years, a lifetime of a million loading situations is required.

Also known from the automotive sector are camera-based solutions which provide a separate camera for each seat and identify occupancy of the associated seat when there is a change to the image captured by the camera in question. However, in complex environments, such as, for example, rail transport where people move during the journey, baggage is placed on seats etc., such solutions are error prone and complicated to implement.

BRIEF SUMMARY OF THE INVENTION

Against this background, the present invention is based on the object of providing a method for the reliable identification of seat occupancy, in particular in complex environments.

This object is achieved by a method with the features as claimed.

The invention is also based on the object of providing a long-lasting apparatus for carrying out this method.

This object is achieved by an apparatus with the features as claimed.

Advantageous developments are in each case the subject of dependent subclaims.

The method according to the invention for identifying seat occupancy provides that a camera is oriented such that it captures at least one area of interest of the seat. An evaluation apparatus identifies the area of interest in an image taken by the camera and stores a position of the area of interest. In images subsequently taken by the camera, the evaluation apparatus selects the area of interest at the stored position and compares it with at least one stored image sample. The result of this comparison is used to identify the seat as occupied.

Here, an area of interest should be understood as being an image area to be used for the evaluation of the images. This can, for example, entail specific areas of the seat. Preferably, a head area of the seat is captured as an area of interest. A head area should be understood to be the area of the seat in which the head of a person sitting on the seat is usually located. If the seat has a head rest, the head area of this seat can advantageously be formed by this head rest. Capturing the head area as an area of interest has inter alia the advantage that it is less common for baggage or clothing to be placed in the head area than in the other areas of the seat.

In the present case, the position of the area of interest designates the spatial position of the area of interest considered in each case or, in the case of a constant camera orientation, the position of this area of interest in the overall image of the camera.

The method according to the invention enables reliable identification of occupancy of the seat in complex environments. Moreover, one camera can be used for the identification of the occupancy of a plurality of seats. This means apparatuses for carrying out the method can be implemented inexpensively. Since only the areas of interest are evaluated for the identification of the seat occupancy, it is not necessary for the entire seat to be visible on the images taken by the camera. It is, for example, possible for one or more cameras to be installed on the ceiling in passenger compartments of vehicles. It is also possible for cameras already present in the passenger compartments for other purposes to be used to carry out the method. Compared to the sensors described in the introduction, which are arranged in the seats and mechanically loaded, the essentially optical method is wear-free and hence permanently reliable.

In one embodiment of the method, the identified area of interest is stored as an image sample. With the above-described comparison, the selected area of interest is compared with this image sample. If the result of the comparison identifies a discrepancy between the selected area of interest and the image sample, the seat is identified as occupied.

Advantageously, with this embodiment, a plausibility check is performed before the seat is identified as occupied. Particularly in complex environments, this enables the avoidance of erroneous identifications of seat occupancy, which can, for example, arise due to a piece of baggage being placed on the seat or a piece of clothing being hung in front of the seat.

During the plausibility check, the discrepancy from the image sample found as a result is compared with a parameterized interference pattern. The parameterized interference pattern can, for example, be a geometric shape resembling a human body part. In the simplest case, the parameterized interference pattern can be provided as a circle with a radius that can be altered within limits as an approximate depiction of a human head. The seat is identified as occupied if the parameterized interference pattern can be brought into coincidence with the discrepancy at least to a prespecified minimum degree by the choice of parameters lying within prespecified parameter limits. In the example described of a circle with a changeable radius, this means the following: if a radius of the circle can be selected with which the circle depicting the interference pattern can be brought into coincidence with the discrepancy with sufficient accuracy, the discrepancy is assessed as being a human head and the seat is identified as being occupied.

Advantageously, the parameterized interference pattern used is an ellipse with prespecified parameter limits for its major axis length and its minor axis length. This on its own facilitates an acceptable approximation of the interference pattern to the shape of the human head. However, the shape of the human head can, in principle, be approximated with any number of parameters and in this way the number of erroneous seat occupancy identifications reduced still further. In practice, the use of a parameterized shape of the human head as parameterized interference pattern has proved to be particularly useful, since the human head, or at least a large portion thereof is very frequently uncovered.

Alternatively or additionally to the described parameterized interference pattern, the discrepancy can be examined by means of the evaluation apparatus for biometric features of a human head. The seat is identified as occupied if a prespecified minimum quantity of biometric features is found in the discrepancy. This enables the proportion of erroneous seat occupancy identifications to be reduced in another way or to a further degree. In this context, possible biometric features can in principle be all identifiable features of the human body. For example, the number of eyes, the number of ears, the eye spacing, the eye-nose spacing or other features can be evaluated.

If the plausibility check reveals that the seat is occupied not by a human, but by baggage or a piece of clothing, the vehicle attendant can be notified that the seat is occupied not by a human, but by another object where this is advantageous for the respective application in question.

In another embodiment of the method, an infrared camera is used as the camera. At least one thermal image pattern of a human head is provided as the at least one stored image sample. The seat is identified as occupied, if as a result of the comparison performed by means of the evaluation apparatus, a structure is found in the selected area of interest which coincides with at least one of this at least one thermal image pattern to a prespecified minimum degree. This embodiment offers the advantage that the seat occupancy can be identified reliably independently of the lighting situation. Moreover, due to their heat radiation, humans can be identified more simply or more inexpensively than with cameras working in the visible wavelength range. Preferably, a passive infrared camera is used.

Preferably, a marking arranged in the identified area of interest identifying the seat is read and the information read is stored. Particularly preferably, this takes place before the area of interest is selected and compared with the stored image sample by means of the evaluation apparatus. Reading said marking enables the seat captured by the camera to be identified. If the camera captures the areas of interest of a plurality of seats, this enables the respective area of interest to be assigned to a specific seat. The occupancy statuses identified in the different areas of interest can then be assigned to specific seats. Hence, the occupancy status of a seat can be stored for each identified seat, optionally together with the position thereof within the vehicle and/or provided for further processing. The marking can be embodied as a bar code or two-dimensional code. Codes can be read reliably. They can also be printed or stuck on the seat in a comfortable manner.

In one advantageous variant, the piece of information read or pieces of information read for a plurality of seats is/are compared with stored master data. This stored master data can, for example, be the number of seats in an area captured by the camera or the identification data for these seats. If this comparison reveals a difference between the master data and the stored read information, a warning message can be output and/or the reading of the marking identifying the seat or the seats can be repeated.

If a seat is identified as occupied, advantageously one or more debouncing is performed to prevent the occupied status of the seat from being erroneously cancelled, for example if passenger stands up temporarily or visits the toilet or buffet car. Advantageously, therefore, for a seat which was previously identified as occupied for which the evaluation apparatus does not identify any discrepancy of the area of interest from the image sample, the occupied status thereof is only cancelled after the expiry of a prespecified period of time as long the seat is not again identified as occupied within this period of time. In this case, the prespecified period of time is preferably selected differently for different driving statuses of the vehicle in which the seat is arranged. If, for example, a vehicle is moving on an open track, a longer period of time is specified than when the vehicle is stationary at a stopping point.

Alternatively or additionally, in driving statuses for which it is known that a large number of movements of persons take place—for example at stopping points with movements to get on or off—the occupancy identification of a seat can be switched off or ignored. This also enables the proportion of erroneous seat occupancy identifications to be reduced.

In one advantageous method variant, the camera is oriented such that it captures the respective associated area of interest for a plurality of seats. Moreover, the method according to the invention or any development thereof can be performed for at least some, preferably for each, of these seats. This enables one single camera, and hence low expenditure on equipment, to be used to identify the occupancy statuses of a plurality of seats located in the area captured by this one camera.

Alternatively or supplementarily thereto, the camera can be alternately oriented such that it captures the areas of interest of different seats or different groups of seats in alternation. If the camera in each case only captures one seat with each orientation, this enables the occupancy statuses of different seats to be identified. On the other hand, if the camera in each case identifies different groups of seats with different orientations, this enables the occupancy statuses of the seats in these groups of seats to be identified with low expenditure on equipment. In this case, the identification of the occupancy statuses of the individual seats in a group of seats takes place in that, as described above, in each case the associated area of interest of the different seats in this group of seats is captured and the method according to the invention or any development thereof is performed for each of these seats.

In addition to the camera, the apparatus according to the invention comprises an evaluation apparatus, which is configured to identify areas of interest in images taken by the camera with reference to a pattern identification and to store them together with the positions thereof. The evaluation apparatus is further configured to compare areas of interest from images taken by the camera with stored image patterns. In this context, the term of the position of an area of interest should be understood as explained above.

Since, unlike the mechanically loaded seat occupancy sensors described in the introduction, the apparatus described is not subject to any mechanical loading, it is much longer lasting and more resistant to wear than said sensors.

The apparatus is preferably configured to identify a plurality of areas of interest in an image taken by the camera and to store the positions thereof. This enables the identification of the occupancy statuses of a plurality of seats in an inexpensive manner in conjunction with the manner described in the method.

The evaluation apparatus is advantageously configured to store the areas of interest identified, to determine discrepancies during the comparison and compare these discrepancies determined with a parameterized interference pattern. As described above, this enables a more reliable identification of the seat occupancy status.

A further reduction in erroneous seat occupancy identifications is enabled by the use of an evaluation apparatus, which is configured to store areas of interest identified, to determine discrepancies during the comparison and to examine these discrepancies determined for biometric features of a human head.

In an alternative variant, the camera is embodied as an infrared camera, preferably as a passive infrared camera.

The evaluation apparatus is moreover configured, during the described comparison of areas of interest with stored image patterns in the areas of interest, to identify a structure, which coincides with one of the stored image samples at least to a prespecified minimum degree. With this variant, the apparatus is able to evaluate areas of interest of images taken by an infrared camera and utilize the advantages described in conjunction with the corresponding embodiment of the method.

The evaluation apparatus is preferably configured to identify and read markings of the seat contained in images taken by the camera. These markings are particularly preferably bar codes or two-dimensional codes. These enable the information to be read using proven methods and apparatuses. Hence, an identified occupancy status can be uniquely assigned to a specific seat and said seat located. If an infrared camera is used, the markings are expediently embodied as heatable. In particular, the bars of the bar codes can be embodied as heatable so that the individual bars can be identified in a thermal image.

Depending upon the application in question, it can be advantageous to provide a transmission device by means of which the data read from the markings for one or a plurality of seats and the occupied status thereof can be forwarded. This enables the occupancy statuses of the seats to be made available for further processing.

The camera is preferably equipped with a detector and an optical system, which is suitable for detecting fluorescent or phosphorescent signals from a fluorescent or phosphorescent marking. This enables the markings applied to the seat also to be read in difficult lighting conditions as long as fluorescent or phosphorescent markings are provided.

The above-described properties, features and advantages of this invention and also the manner in which these are achieved will become clearer and more plainly comprehensible in conjunction with the following description of the exemplary embodiments explained in more detail in conjunction with the drawings. Where expedient, elements in these drawings with the same function are given the same reference characters. The invention is not restricted to the exemplary embodiments depicted in the figures—including with respect to functional features. The preceding description and the following description of the figures contain numerous features which are specified, sometimes in combination, in the dependent subclaims. However, a person skilled in the art will also consider these features individually along with all the remaining features disclosed above and in the description of the figures below and will combine said features in expedient further combinations. In particular, these features can be combined individually and in any suitable combination with the method and/or the apparatus of the independent claims.

The drawings show:

DESCRIPTION OF THE INVENTION

Figure 1:
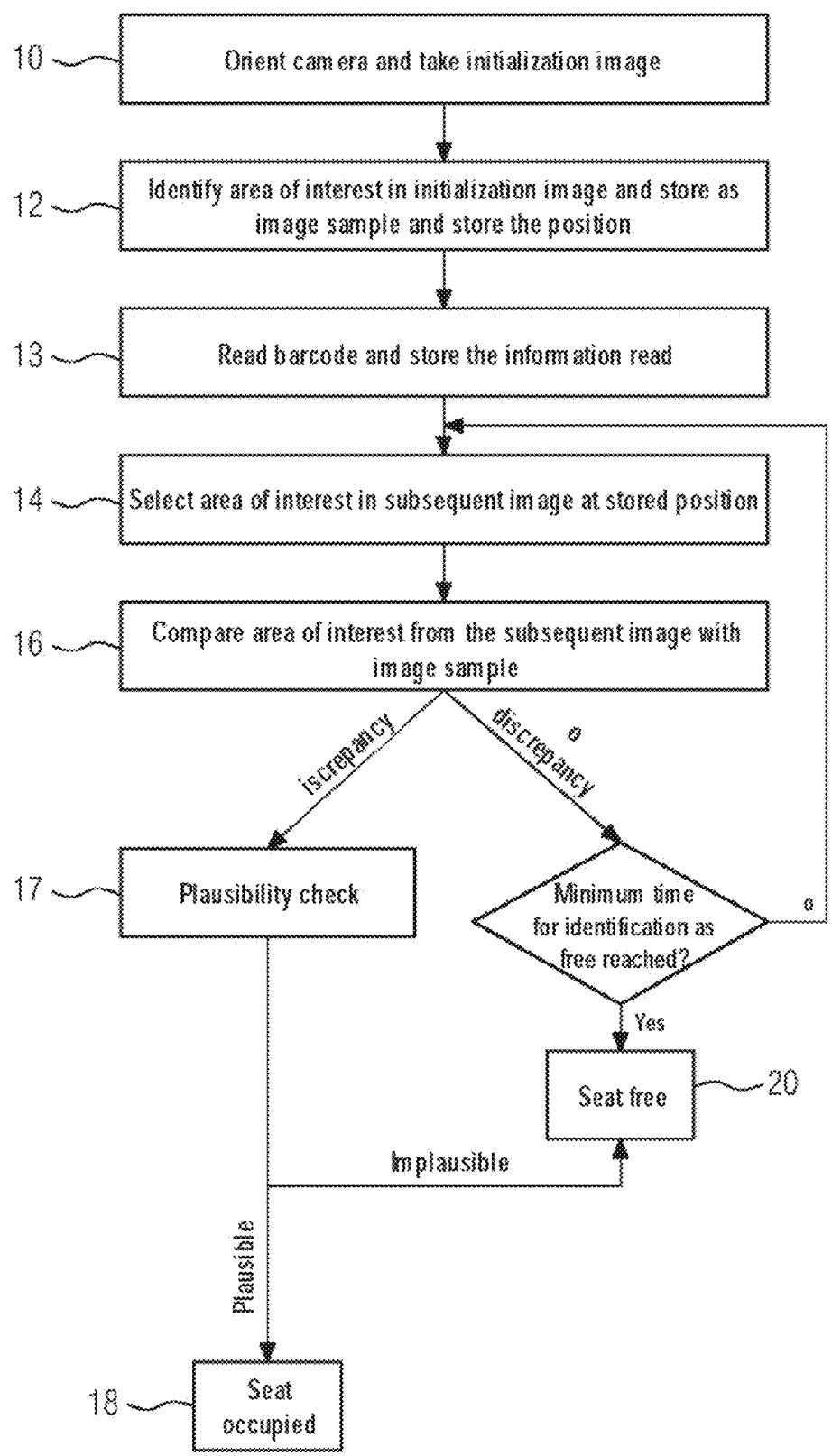
FIG. 1 a schematic representation of a first exemplary embodiment of the method, FIG. 2 a seat provided with a marking, FIG. 3 an area of interest of the seat in FIG. 2, FIG. 4 the area of interest in FIG. 3 in the case of occupancy of the seat, FIG. 5 a schematic depiction of a comparison of a discrepancy of an image sample with a parameterized interference pattern, FIG. 6 a schematic representation of a second exemplary embodiment of the method according to the invention, FIG. 7 the seat in FIG. 2 with a position of an area of interest, FIG. 8 an area of interest of the seat in FIG. 7, FIG. 9 the area of interest in FIG. 8 in the case of occupancy of the seat, FIG. 10 a schematic depiction of an exemplary embodiment of the apparatus according to the invention.
Figure 2:
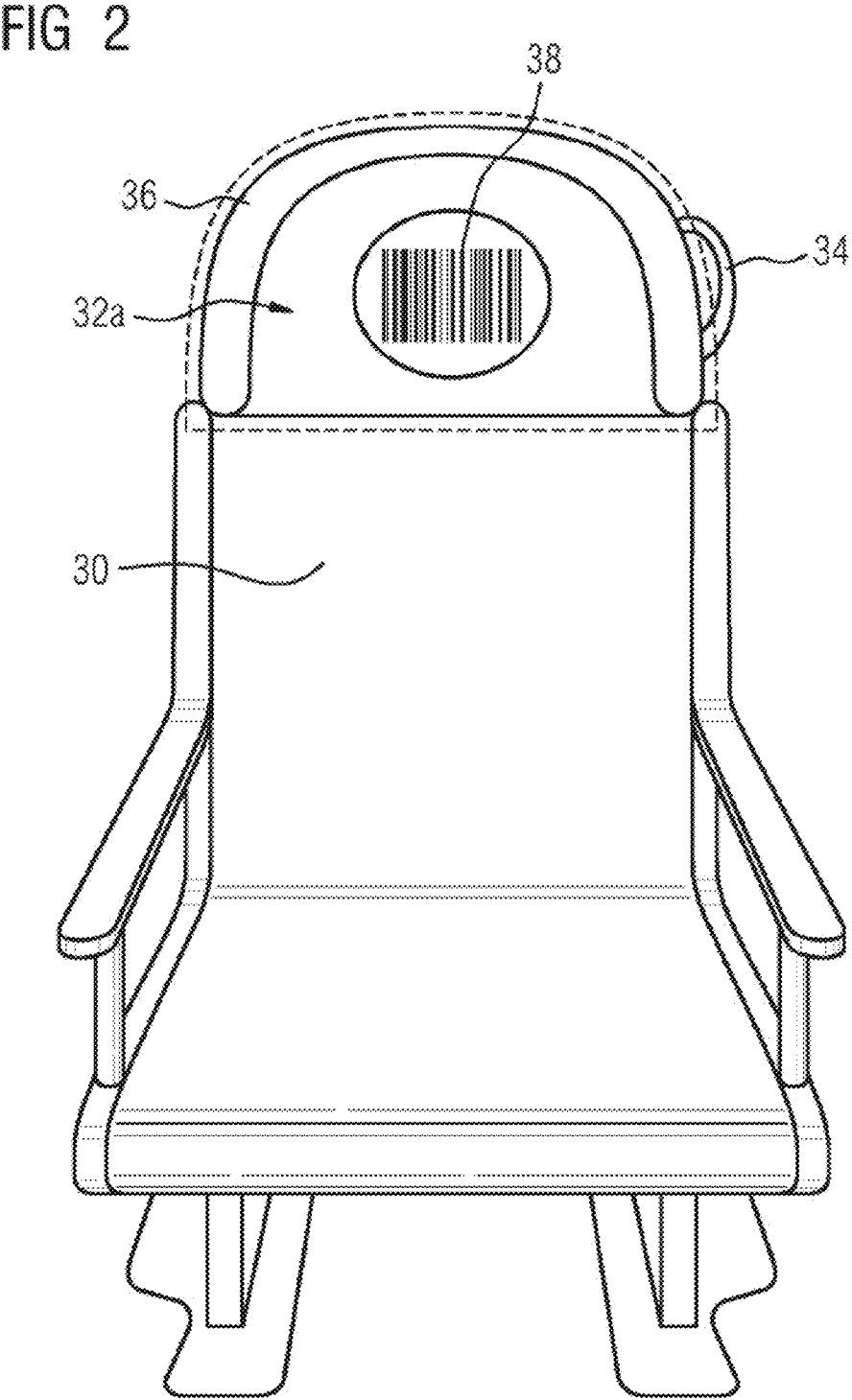

FIG. 1 is a schematic representation of a first exemplary embodiment of the method according to the invention. This is explained below in more detail with the aid of the depictions in FIGS. 2 to 5. According to the exemplary embodiment in FIG. 1, initially a camera is oriented 10 such that that it captures at least one area of interest of a seat 30. The oriented camera then takes an initialization image 10. In the further course of the method, an evaluation apparatus identifies an area of interest in the initialization image and stores this together with its position as an image sample 12. In the example of the seat 30 in FIG. 2, the area of interest selected is a head area 32a, which, in the depiction in FIG. 2, is shown framed by dashed lines. This head area 32a is shown again separately in FIG. 3 and is substantially formed by a head rest 36 of the seat 30. Depending upon how exactly the head area 32a can be identified, it can also comprise remnants of a handle 34 of the seat 30. Hence, the head area 32a in FIG. 3 simultaneously represents the at least one, and in the exemplary embodiment in FIG. 1, only, stored image sample 40.

The head area 32a, or the head rest 36, has a marking embodied as a bar code 38. Advantageously, this can be a fluorescent or phosphorescent bar code. This marking identifying the seat 30 identified is subsequently read 13 and the information read stored 13.

Figure 4:
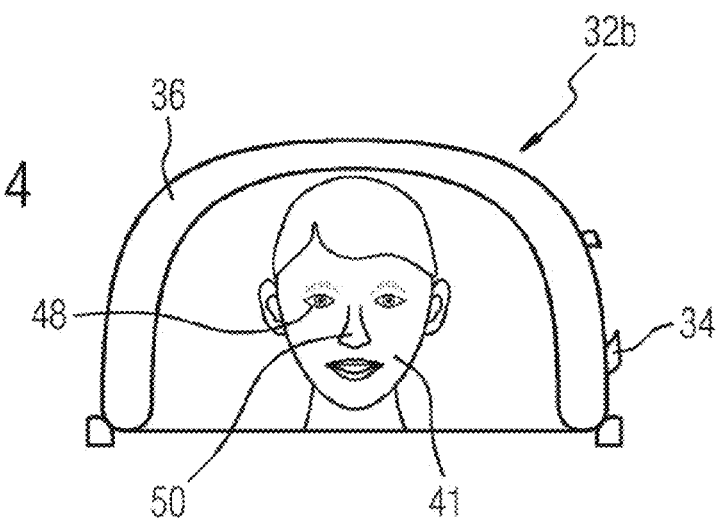

The camera then takes a subsequent image and the area of interest is selected 14 at the stored position of the head area 32a in this subsequent image. In the example of the seat 30 in FIG. 2, the area of interest originating from this subsequent image is logically once again a head area 32b of the seat 30. This is shown in FIG. 4. As may be identified in FIG. 4, before the subsequent image is taken, a person has sat down on the seat 30 with his head arranged in the head area 32b. Hence, this head represents hence a discrepancy 41 with respect to the head area 32a.

Figure 3:
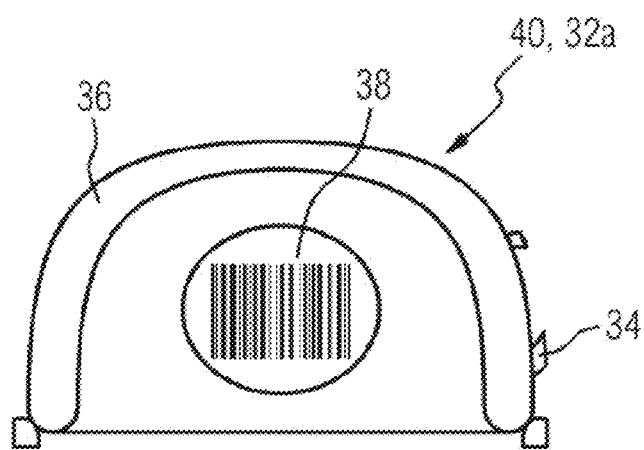

In the further course of the method, the area of interest of the subsequent image is compared with the stored image sample 16. In the example of the seat 30 shown in FIG. 2, this means a comparison of the head area 32b in FIG. 4 with the head area 32a in FIG. 3 representing the image sample 40. The discrepancy 41 is identified thereby. In order to ensure that this discrepancy 41 is actually attributable to occupancy of the seat 30 and not to any objects placed on the seat 30, the exemplary embodiment in FIG. 1 then carries out a plausibility check 17. If as a result, the discrepancy 41 is considered to be plausible for seat occupancy, the seat 30 is identified as occupied 18. If this is not the case, the seat 30 is considered to be free 20.

Figure 5:
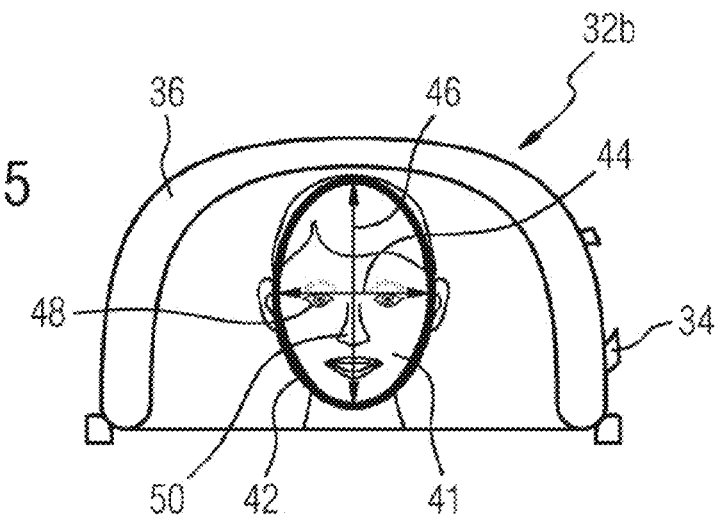

FIG. 5 illustrates a plausibility check with reference to a comparison of the discrepancy 41 with a parameterized interference pattern. In this case, the parameterized interference pattern used is an elliptical interference pattern 42, wherein a major axis length 46 and a minor axis length 44 represent the parameters of this elliptical interference pattern 42. These parameters are assigned prespecified parameter limits within which the minor axis length 44 and the major axis length 46 are varied in order to bring the elliptical interference pattern into coincidence with the discrepancy 41 as well as possible. In the depiction in FIG. 5, this has already taken place. As can be identified, in this case, the elliptical interference pattern 42 is largely brought into coincidence with the discrepancy 41. In one embodiment of the invention, this on its own can be considered to be sufficient for a successful conclusion of the plausibility check 17. However, in the present exemplary embodiment described, in order further to reduce erroneous identifications of seat occupancy, the discrepancy 41 is examined for biometric features of a human head. In this part of the plausibility check 17, checking routines that are known per se are used to check whether the discrepancy 41 at least one eye 48 and one nose 50. However, it is in principle also possible to use other biometric features. In the example shown in FIG. 5, these biometric features are present so that the seat is identified as occupied 18.

The exemplary embodiment in FIG. 1 provides that, for a seat which was previously identified as occupied, for which the comparison 16 of the area of interest of the subsequent image with the image sample does not identify any discrepancy, the occupied status thereof is only cancelled after the expiry of a prespecified period of time. If this minimum time for identification as free is reached, the seat is identified as free 20. If the minimum time for identification as free is not reached, occupied status is retained and the area of interest selected 14 in the next subsequent image and compared with the image sample 16. The prespecified period of time and hence the minimum time for the identification as free can, as described above, be varied in accordance with the driving status of a vehicle in which the seat 30 is installed.

For ease of understanding, the exemplary embodiment in FIGS. 1 to 5 was described using one seat 30 captured by the camera. However, if the camera is oriented such that it captures the respective associated area of interest of a plurality of seats, the further method steps can be performed for each of these seats and the respective associated areas of interest and in this way the occupancy of each of these seats identified.

Figure 6:
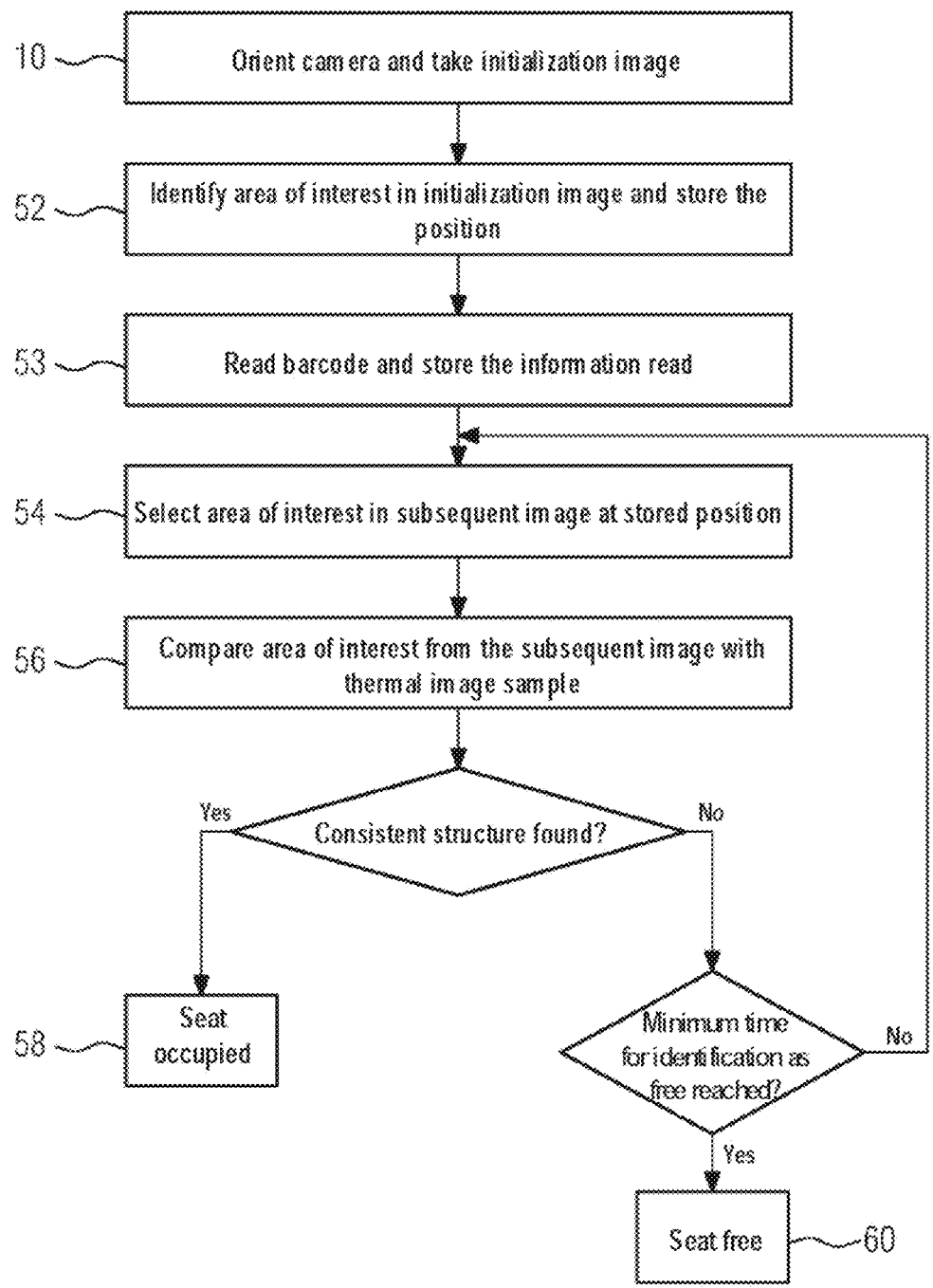

FIG. 6 is a schematic representation of a second exemplary embodiment of the method according to the invention. This will be described below in more detail with reference to FIGS. 7 to 9. As in the exemplary embodiment in FIG. 1, initially a camera is oriented 10 such that it captures at least one area of interest of the seat 30. Then, the camera, which in the exemplary embodiment in FIG. 6 is a passive infrared camera, takes an initialization image 10.

In the further course of the method, an evaluation apparatus identifies an area of interest in the initialization image and stores the position thereof 52.

Figure 7:
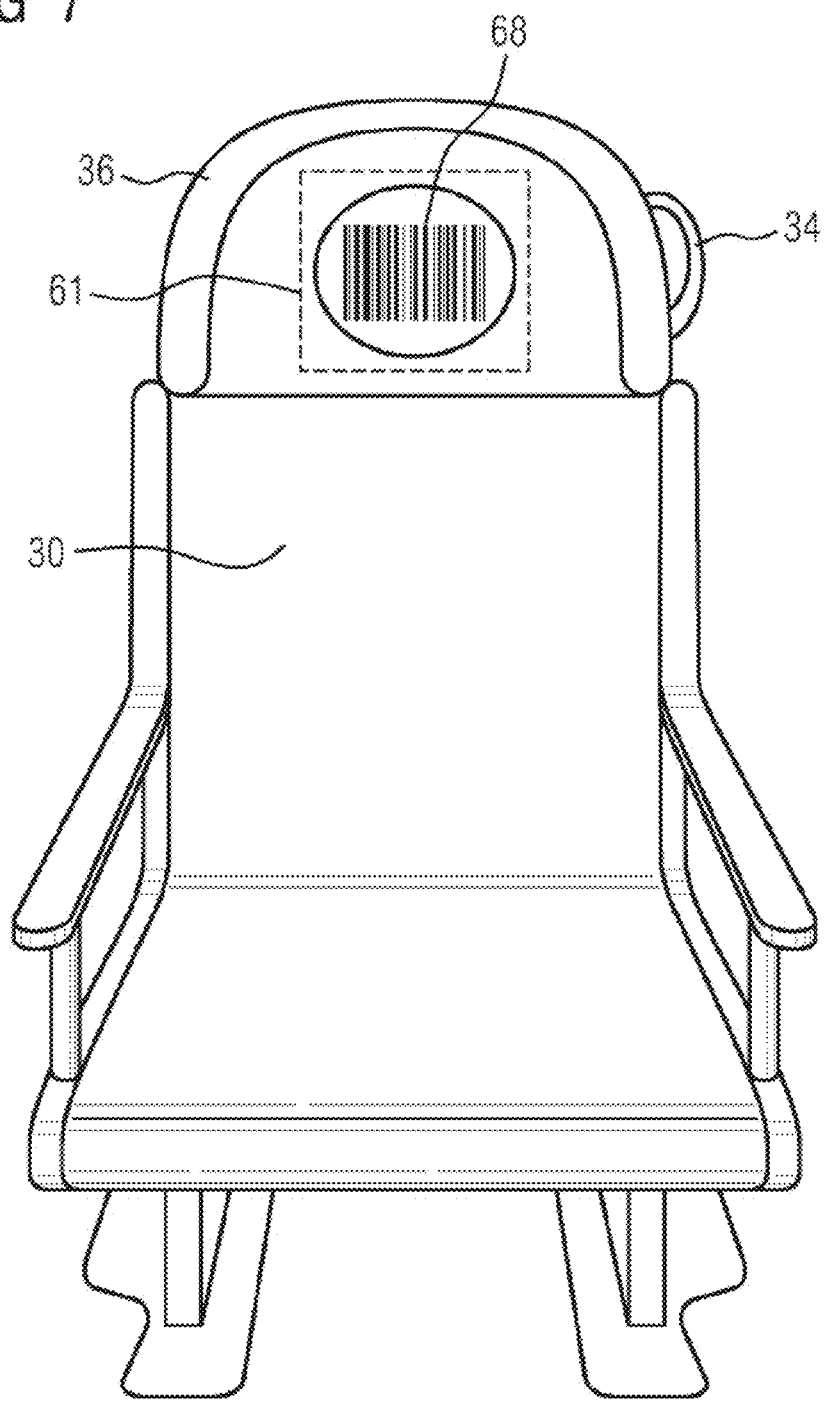
Figure 8:
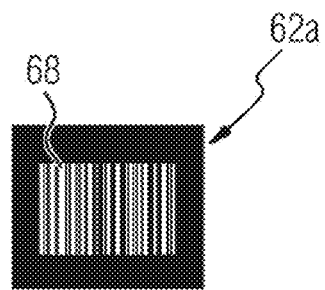

In the exemplary embodiment in FIG. 6, the area of interest is an area surrounding a heated bar code 68. In FIG. 7, which is not an infrared image of the seat 30, but represents a usual depiction of this seat 30, the position 61 of this area of interest is indicated by means of a dashed line. FIG. 8 shows the area of interest 62a identified in the initialization image. Since the initialization image is a thermal image taken by the infrared camera, the heated bar code 68 appears light in the depiction in FIG. 8 and the cold environment is black.

In the further course of the method, the heated bar code 38, which represents a marking of the seat 30, is read and the information is stored 53.

Figure 9:
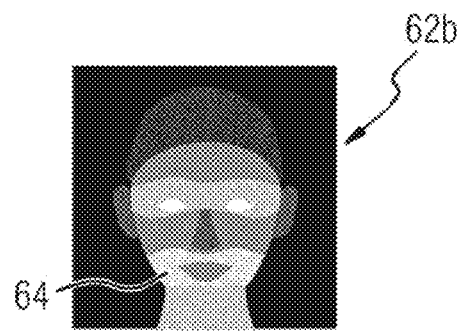

Then, the camera takes a subsequent image and the area of interest selected 54 at the stored position of the area of interest 62a in this subsequent image. This selected area of interest 62b is depicted in FIG. 9. As may be identified in FIG. 9, before the subsequent image is taken, once again a person can sit down on the seat 30 so that a thermal image of a human head can be identified in the area of interest 62b.

The area of interest 62b depicted in FIG. 9 is then compared with different stored thermal image patterns of a human head 56. This comparison 56 is performed by the evaluation apparatus. Since the area of interest from the subsequent image 62b depicted in FIG. 9 can be attributed to a human head, during this comparison 56 a structure 64 is found in the area of interest 62b that coincides with one of the stored thermal image patterns of a human head to a required minimum degree. As a result, the seat is identified as occupied 58. If, on the other hand, no structure coinciding with a thermal image pattern to a sufficient degree were found, the seat would be identified as free 60.

Similarly to the case in the exemplary embodiment in FIG. 1, before the seat is identified as free 60, a check is performed as to whether the seat had previously been identified as occupied. If this was the case and if the comparison 56 of the area of interest of the subsequent image did not find any structure coinciding with the thermal image patterns, the occupied status of the seat 30 is only cancelled after a prespecified period of time. If this minimum time for identification as free is reached, the seat is identified as free 60. If, on the other head, this minimum time for identification as free is not reached, occupied status is retained and the area of interest 54 contained in the next subsequent image selected and compared with the thermal image patterns 56. The prespecified period of time and, hence, the minimum time for identification as free can, as described above, be varied according to the driving status of a vehicle in which the seat 30 is installed. This makes it possible to prevent occupied status of the seat being cancelled erroneously, for example if a passenger stands up temporarily or visits the toilet.

For ease of understanding, the exemplary embodiment in FIGS. 6 to 9 was again described using one seat 30 captured by the camera. However, if the camera is oriented such that it captures the respective associated area of interest of a plurality of seats, the further method steps according to the depiction in FIG. 6 can be performed for each of these seats and the respective associated areas of interest and in this way the occupancy of each of these seats identified.

Figure 10:
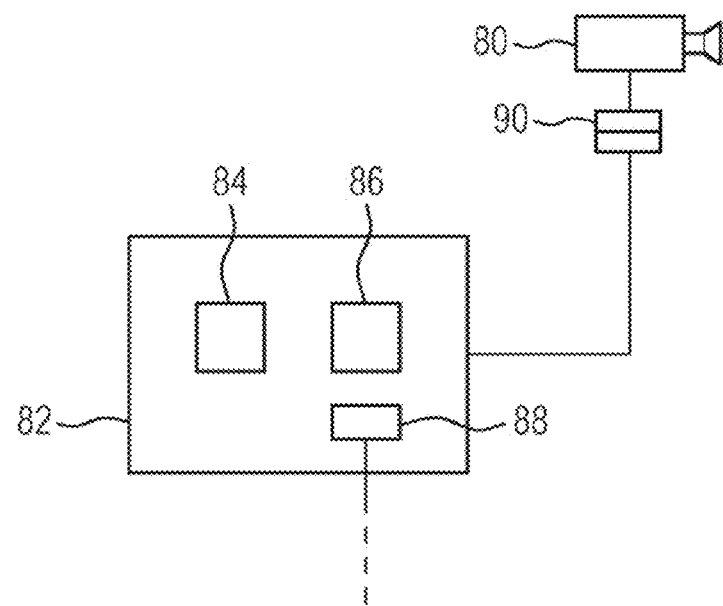

FIG. 10 shows an exemplary embodiment of an apparatus by means of which the method according to the invention can be performed. In addition to a camera 80, this apparatus comprises an evaluation apparatus 82. The evaluation apparatus 82 is configured to identify areas of interest in images taken by the camera 80 using pattern identification methods that are known per se and store them together with the position of the areas of interest. The evaluation apparatus 82 is also configured to compare the areas of interest with stored image patterns and to determine discrepancies. For the purposes described, the evaluation apparatus 82 comprises a storage apparatus 84 and a computing apparatus 86.

The evaluation apparatus 82 is also configured to compare the discrepancy 41 determined with the parameterized, elliptical interference pattern 42 and to bring the interference pattern into coincidence with the discrepancy 41 as far as possible.

The evaluation apparatus 82 is also configured to examine the discrepancy at least for the biometric features of the presence of at least one eye and one nose. In addition, the evaluation apparatus 82 is configured to identify and read the bar code 38 in images taken by the camera 80 to store the information read.

Moreover, the evaluation apparatus 82 depicted in FIG. 6 comprises a transmission device 88 by means of which data read from the bar code 38 regarding the seat 30 and the occupancy status thereof can be forwarded, for example to a higher-ranking data-processing apparatus in a vehicle.

If the camera 80 is embodied as an infrared camera and the evaluation apparatus 82 is configured, during the comparison of areas of interest from images taken by the camera 80 with stored image patterns in the areas of interest, to identify a structure, which coincides with one of the stored image samples at least to a prespecified minimum degree, the apparatus depicted in FIG. 10 can be used to carry out the method according to FIG. 6.

The camera 80 and the evaluation apparatus 82 are adapted for the simultaneous capture and processing of areas of interest of a plurality of seats. As a result, it is possible to identify the occupancy statuses of a plurality seats with relatively little expenditure on equipment. In addition, the camera 80 can be rotated by means of a positioning apparatus 90 and mounted with a variable inclination so it can be alternately oriented that it captures the areas of different seats or different groups of seats in alternation. This enables the occupancy statuses of even more seats to be identified with low expenditure on equipment.

Although the invention was illustrated and described in more detail by the preferred exemplary embodiments, the invention is not restricted by the disclosed examples and other variants can be derived herefrom by the person skilled in the art without departing from the scope of protection of the invention.

The invention claimed is:

1. A method for identifying occupancy of a seat, the method comprising:
   orienting a camera towards and capturing at least one area of interest of the seat;
   identifying the area of interest in an image taken by the camera with an evaluation apparatus and storing a position of the area of interest as a given image sample;
   selecting the area of interest in images subsequently taken by the camera at the stored position by the evaluation apparatus and comparing the selected area of interest with the given image sample;
   in the event of a discrepancy between the selected area of interest and the given image sample, identifying the seat as being occupied;
   before identifying the seat as being occupied, performing a plausibility check;
   comparing a deviation from the image sample with a parameterized interference pattern and identifying the seat as being occupied if the parameterized interference pattern can be brought into coincidence with the deviation at least to a prespecified minimum degree by a choice of parameters lying within prespecified parameter limits.

2. The method according to claim 1, which comprises defining a head area of the seat as an area of interest of the seat.

3. The method according to claim 1, which comprises examining a deviation from the image sample by the evaluation apparatus for biometric features of a human head and identifying the seat as being occupied if a prespecified minimum quantity of the biometric features is found in the deviation.

4. The method according to claim 1, which comprises:
   using an infrared camera as the camera;
   providing at least one thermal image pattern of a human head is provided as the at least one stored image sample; and
   identifying the seat as being occupied if said comparison finds a structure in the selected area of interest which coincides with at least one thermal image pattern to a prespecified minimum degree.

5. The method according to claim 1, which comprises reading a marking disposed in the identified area of interest identifying the seat and storing the information.

6. The method according to claim 1, which comprises, for a seat that was previously identified as being occupied and that is not currently identified as being occupied, canceling the occupied status only after an expiry of a given period of time as long as the seat is not again identified as being occupied within the given period of time.

7. The method according to claim 1, which comprises:
   orienting the camera towards areas of interest of a plurality of seats; and
   performing the method steps for at least some of the seats.

8. The method according to claim 7, which comprises performing the method steps for each of the seats.

9. An apparatus for identifying occupancy of a seat by carrying out the method according to claim 1, the apparatus comprising:
   a camera;
   an evaluation apparatus configured to:
      identify areas of interest in images taken by said camera with reference to a pattern identification and store positions of the areas of interest; and
      compare areas of interest from images taken by the camera with stored image patterns; and
      store areas of interest identified, to determine discrepancies during the comparison and to compare the discrepancies with a parameterized interference pattern.

10. The apparatus according to claim 9, wherein said evaluation apparatus is configured to store areas of interest identified, to determine discrepancies during the comparison and to examine the discrepancies for biometric features of a human head.

11. The apparatus according to claim 9, wherein said camera is an infrared camera and said evaluation apparatus is configured to identify a structure in the areas of interest during the comparison, which coincides with one of the stored image samples at least to a predetermined minimum degree.

12. The apparatus according to claim 9, wherein said evaluation apparatus is configured to identify and read markings of the seat in images taken by the camera.

13. The apparatus according to claim 12, wherein the markings are bar codes or two-dimensional codes.

* * * * *